United States Patent [19]
Goettsche

[11] Patent Number: 5,657,411
[45] Date of Patent: Aug. 12, 1997

[54] NEGATIVE TRIMMING OF FIBER OPTIC WINDING

[75] Inventor: Randy P. Goettsche, Phoenix, Ariz.

[73] Assignee: Honeywell Inc., Minneapolis, Minn.

[21] Appl. No.: 573,239

[22] Filed: Dec. 15, 1995

[51] Int. Cl.⁶ .................................................. G02B 6/02
[52] U.S. Cl. ...................................................... 385/123
[58] Field of Search ........................... 385/115, 12, 123, 385/147, 11; 356/350; 242/159, 166, 174, 176; 250/227.14, 227.17, 568

[56] References Cited

U.S. PATENT DOCUMENTS

| | | | |
|---|---|---|---|
| 4,044,227 | 8/1977 | Holm et al. | 235/437 |
| 4,291,984 | 9/1981 | Albares | 356/350 |
| 4,545,682 | 10/1985 | Greenwood | 356/350 |
| 4,588,296 | 5/1986 | Cahill et al. | 356/350 |
| 4,591,269 | 5/1986 | Mohr | 356/350 |
| 4,699,451 | 10/1987 | Mohr | 350/96.15 |
| 4,702,599 | 10/1987 | Mohr | 356/350 |
| 4,724,316 | 2/1988 | Morton | 250/227 |
| 4,743,115 | 5/1988 | Arditty et al. | 356/350 |
| 4,781,461 | 11/1988 | Baron et al. | 356/350 |
| 4,842,409 | 6/1989 | Arditty et al. | 356/350 |
| 4,856,900 | 8/1989 | Ivancevic | 356/350 |
| 4,873,030 | 10/1989 | Taketani et al. | 264/1.5 |
| 4,950,049 | 8/1990 | Darsey et al. | 350/96.3 |
| 4,955,688 | 9/1990 | Chapin et al. | 350/96.29 |
| 4,957,344 | 9/1990 | Chesler et al. | 350/96.23 |
| 5,168,539 | 12/1992 | Negishi et al. | 385/123 |
| 5,182,785 | 1/1993 | Savegh et al. | 385/128 |
| 5,187,757 | 2/1993 | Ohno et al. | 385/11 |
| 5,329,349 | 7/1994 | Patterson et al. | 356/73.1 |
| 5,377,283 | 12/1994 | Blake et al. | 385/11 |
| 5,475,774 | 12/1995 | Goettsche et al. | 385/123 |
| 5,506,923 | 4/1996 | Goettsche et al. | 385/123 |
| 5,528,715 | 6/1996 | Goettsche et al. | 385/123 |

FOREIGN PATENT DOCUMENTS

| | | | |
|---|---|---|---|
| 0 207 844 A1 | 1/1987 | European Pat. Off. | G01C 19/64 |
| 0 292 103 A2 | 11/1988 | European Pat. Off. | G01C 19/64 |
| 31 38687 A1 | 4/1983 | Germany | F21Q 3/02 |
| 63-33612 | 2/1988 | Japan | G01C 19/64 |
| 63033612 | 7/1988 | Japan | G01C 19/64 |
| 2 146 428 | 4/1985 | United Kingdom | G01P 3/36 |
| WO 93/11406 | 6/1993 | WIPO | G01C 19/72 |
| PCT/US93/ 06844 | 11/1993 | WIPO . | |

OTHER PUBLICATIONS

Patent Abstracts of Japan, Publ. No. JP63033612, pub. date Feb. 13, 1988, Group P727, Tomoya, et al., 1 page.

*Primary Examiner*—Akm E. Aullah
*Attorney, Agent, or Firm*—Marshall, O'Toole, Gerstein, Murray & Borun

[57] ABSTRACT

In a fiber optic coil arrangement for use in rotation sensors, for example, axial or radial errors can be reduced or substantially eliminated by negatively trimming the fiber optic coil. As a result of the negative trimming, a sufficient amount of the predictable turns of the optical fiber is removed from the fiber optic coil so as to interrupt the predetermined pattern with which the fiber optic coil is wound in order to thereby reduce axial or radial related errors which would have otherwise resulted. Alternatively, the fiber optic coil may be negatively trimmed by terminating winding of the fiber optic coil before the predetermined pattern of the fiber optic coil has been completed. The point at which winding is terminated may be selected so as to reduce axial or radial related errors to a desired level.

59 Claims, 7 Drawing Sheets

NEGATIVE TRIMMING OF FIBER OPTIC WINDING

RELATED PATENT APPLICATION

U.S. patent application Ser. No. 08/231,882, which was filed on Apr. 4, 1994 and which is a continuation patent application of U.S. patent application Ser. No. 07/917,866 which was filed on Jul. 21, 1992, discloses the positive trimming of fiber optic coils used in rotation sensors.

FIELD OF THE INVENTION

The present invention relates to fiber optic coils and, more particularly, to the negative trimming of fiber optic coils used in rotation sensors.

BACKGROUND OF THE INVENTION

This invention relates to an optical rotation sensing device which may be used in an advanced global positioning and inertial guidance system.

Optical rotation sensing devices include ring laser gyros, fiber optic rotation sensors, and the like. A fiber optic rotation sensor ordinarily comprises an interferometer which includes a light source, a beam splitter, a detector, and an optical path which is mounted on a platform. Light from the light source is split by the beam splitter into two beams which are directed to opposite ends of the optical path and which then counterpropagate around that path. As the light beams exit the optical path, they are recombined and the resulting combined light beam is sensed by a detector. A sensing circuit connected to the detector determines any phase difference between the counterpropagating light beams.

Assuming that this fiber optic rotation sensor experiences no rotation, ideally no difference in phase between the counterpropagating light beams will be detected. On the other hand, if the sensor experiences rotation, there will be a phase difference between the counterpropagating light beams which can be detected to indicate the extent and direction of rotation.

In a fiber optic rotation sensor, the optical path is provided by an optical fiber which is coiled, usually in multiple layers, around a spool, with each layer containing multiple turns. Currently, such coils are typically wound as quadrupoles. In order to form a quadrupole wound coil, a first end of a continuous optical fiber is wound onto a first intermediate spool, and a second end of the continuous optical fiber is wound onto a second intermediate spool. The first intermediate spool is then used to wind a first layer of turns in a clockwise direction around a sensor spool. This first layer is wound around the sensor spool from a first end to a second end of the sensor spool. The second intermediate spool is then used to wind a second layer of turns in a counterclockwise direction around the sensor spool. This second layer is wound around the sensor spool from the first end to the second end of the sensor spool. The fiber on the second intermediate spool is then wound back from the second end to the first end of the sensor spool to form a third layer. The first intermediate spool is then used to wind a fourth layer of turns from the second end of the spool to the first end.

Thus, a portion of one end of the optical fiber is used to form the first and fourth layers of turns and a portion of the other end is used to form the second and third layers. These four layers of turns are usually referred to as a quadrupole. If "+" and "−" are used to designate the first and second ends of the optical fiber respectively, this quadrupole is wound with a +−−+ predetermined winding pattern in which the length of optical fiber in the "+" layers is substantially equal to the length of optical fiber in the "−" layers. The quadrupole is repeated as often as is desired for a fiber optic rotation sensor. Accordingly, if a second quadrupole is wound with +−−+ layers about the first quadrupole, the resulting two quadrupole arrangement has a +−−++−−+ predetermined winding pattern.

When a fiber optic coil wound in this fashion experiences time varying axial and/or radial dependent changes to the optical path, a phase difference between the light beams which counterpropagate around the optical path may result. If so, the fiber optic rotation sensor employing this fiber optic coil produces a false indication of rotation; that is, this phase difference is an error. For example, an axial and/or radial time varying temperature gradient results in axial and/or radial dependent changes to the optical path which produces a phase difference between the counterpropagating light beams, and this phase difference is an error. Errors may be caused by other environmental conditions such as, but not limited to, mechanical and/or acoustic vibration, axial and/or radial time varying pressure gradients, and axial and/or radial time varying strain gradients. Also, winding the layers of the coil inconsistently in the axial and/or radial directions can exacerbate such errors. Thus, although the present invention is discussed in terms of errors produced by axial and/or radial time varying temperature gradients, the present invention is useful in substantially reducing errors resulting from other axial and/or radial influences as well. Consequently, errors resulting from axial and/or radial influences are referred to herein as axial and/or radial related errors.

SUMMARY OF THE INVENTION

Such errors can be substantially reduced by the present invention. Accordingly, in one aspect of the present invention, a fiber optic coil assembly comprises a fiber optic coil and an error reducing means. The fiber optic coil has first and second axial ends, a plurality of layers wound between the first and second axial ends, and a midpoint. The plurality of layers has a total of c turns of an optical fiber. The optical fiber extends between a first extremity $E_1$ and a second extremity $E_2$, $c_1$ turns of the c turns are wound from the midpoint with a first end of the optical fiber, $c_2$ turns of the c turns are wound from the midpoint with a second end of the optical fiber, $c=c_1+c_2$, $l_1$ is the length of the optical fiber between $E_1$ and the midpoint and includes the $c_1$ turns, and $l_2$ is the length of the optical fiber between $E_2$ and the midpoint and includes the $c_2$ turns. The error reducing means reduces error between phases of light counterpropagating around the fiber optic coil, wherein the error reducing means includes a negative trimming length of the first end of the optical fiber, and wherein the negative trimming length is equal to $l_2-l_1$.

According to another aspect of the present invention, a method of winding a fiber optic coil assembly comprises the following steps: (i) winding a fiber optic coil having s segments, wherein each of the s segments has a pattern of n layers of turns, wherein s is a number, wherein n is a number greater than one, wherein at least one of the n layers of turns is wound predominantly from a first end of an optical fiber, and wherein at least a second of the n layers of turns is wound predominantly from a second end of the optical fiber; and (ii) removing a portion of at least one of the first and second ends of the optical fiber as a negative trimming length so that error between phases of light counterpropagating through the fiber optic coil is reduced from what the error would have been without the negative trimming length, wherein the negative trimming length is unequal in length to an s segment.

According to still another aspect of the present invention, a fiber optic coil comprises a plurality of layers which are wound in a predetermined winding pattern. The fiber optic coil has a sensing axis, and each layer includes a plurality of turns which are wound around the sensing axis and which are wound from an optical fiber. Each turn has a predictable location in the predetermined winding pattern. A portion of at least one layer of the optical fiber in the fiber optic coil is missing so as to interrupt the predetermined winding pattern of the fiber optic coil.

According to yet another aspect of the present invention, a method of winding a fiber optic coil, wherein the fiber optic coil has a sensing axis, comprises the following steps: (i) winding a plurality of layers from an optical fiber in a predetermined winding pattern, wherein each layer is wound into a plurality of turns around the sensing axis so that each turn has a predictable location in the predetermined winding pattern; and (ii) removing a portion of at least one layer of the optical fiber in the fiber optic coil so as to interrupt the predetermined winding pattern of the fiber optic coil.

According to a further aspect of the present invention, a method of winding a fiber optic coil, wherein the fiber optic coil has a sensing axis, comprises the following steps; (i) winding a plurality of layers from an optical fiber in a predetermined winding pattern, wherein each layer is wound into a plurality of turns around the sensing axis so that each turn has a predictable location in the predetermined winding pattern based; and (ii) terminating winding before the predetermined winding pattern is complete so as to interrupt the predetermined winding pattern of the fiber optic coil.

According to a still further aspect of the present invention, a method of winding a fiber optic coil, wherein the fiber optic coil has a sensing axis and is wound from an optical fiber having first and second ends, comprises the following steps: (i) winding a first layer of turns from the first end of the optical fiber, wherein each turn in the first layer of turns is wound into a position which is consistent with a predetermined winding pattern; (ii) winding a second layer of turns from the second end of the optical fiber, wherein each turn in the second layer of turns is wound into a position which is consistent with the predetermined winding pattern; (iii) winding a third layer of turns from the second end of the optical fiber, wherein each turn in the third layer of turns is wound into a position which is consistent with the predetermined winding pattern; (iv) winding a fourth layer of turns from the first end of the optical fiber, wherein each turn in the fourth layer of turns is wound into a position which is consistent with the predetermined winding pattern; and (v) removing a portion of at least one layer of the optical fiber in the fiber optic coil so as to interrupt the predetermined winding pattern of the fiber optic coil.

According to a yet further aspect of the present invention, a method of winding a fiber optic coil, wherein the fiber optic coil has a sensing axis and is wound from an optical fiber having first and second ends, comprises the following steps: (i) winding a first layer of turns from the first end of the optical fiber, wherein each turn in the first layer of turns is wound into a position which is consistent with a predetermined winding pattern; (ii) winding a second layer of turns from the second end of the optical fiber, wherein each turn in the second layer of turns is wound into a position which is consistent with the predetermined winding pattern; (iii) winding a third layer of turns from the second end of the optical fiber, wherein each turn in the third layer of turns is wound into a position which is consistent with the predetermined winding pattern; (iv) winding a fourth layer of turns from the first end of the optical fiber, wherein each turn in the fourth layer of turns is wound into a position which is consistent with the predetermined winding pattern; and (v) terminating winding of at least one of the layers before the predetermined winding pattern is complete so as to interrupt the predetermined winding pattern of the fiber optic coil.

According to another aspect of the present invention, a method of winding a fiber optic coil, wherein the fiber optic coil has a sensing axis, comprises the following steps: (i) winding a plurality of layers from an optical fiber in a predetermined winding pattern, wherein each layer is wound into a plurality of turns around the sensing axis so that each turn has a predictable location in the predetermined winding pattern; and (ii) removing a portion of at least one layer of the optical fiber in the fiber optic coil so as to interrupt the predetermined winding pattern of the fiber optic coil and so as to reduce measured error in the fiber optic coil.

According to yet another aspect of the present invention, a method of trimming a fiber optic coil, wherein the fiber optic coil has a plurality of layers, and wherein each layer comprises a plurality of coil turns wound from a corresponding end of an optical fiber, comprises the following steps: (a) mounting the fiber optic coil in such a manner that a difference between light beams counterpropagating through the fiber optic coil may be determined; (b) observing the difference between the light beams counterpropagating through the fiber optic coil; and, (c) removing at least a portion of a layer of the fiber optic coil so as to reduce error between the phases of the light beams counterpropagating through the fiber optic coil.

BRIEF DESCRIPTION OF THE DRAWING

These and other features and advantages will become more apparent from a detailed consideration of the invention when taken in junction with the drawing in which.

DETAILED DESCRIPTION

Figure 1:
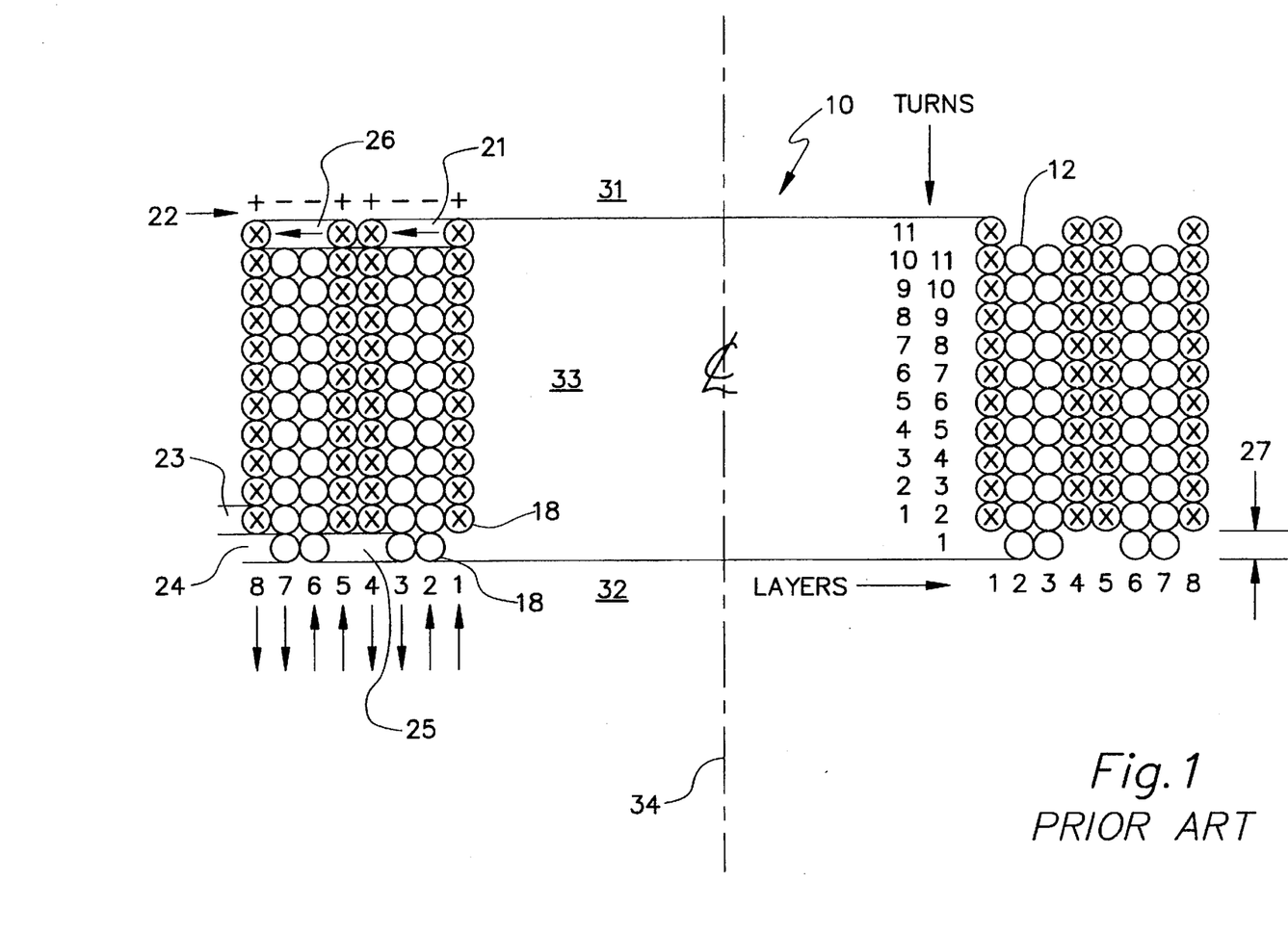
FIG. 1 shows a prior art fiber optic coil arrangement having two quadrupoles which are wound in a +--++--+ predetermined winding pattern.
Figure 5:
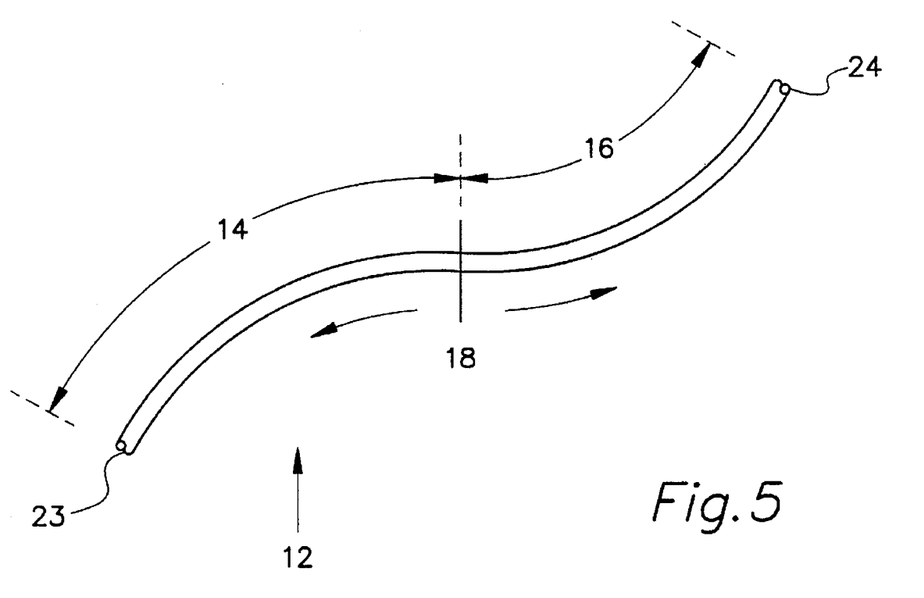
FIG. 5 shows an optical fiber useful in winding the fiber optic coils according to the present invention.

As shown in FIG. 1, a quadrupole wound fiber optic coil 10 is wound using the ends of an optical fiber 12 which is shown in FIG. 5. The optical fiber 12 has a first end 14, a second end 16, and a point 18 between the first and second ends 14 and 16. Accordingly, layer 1 of the quadrupole wound fiber optic coil 10 is wound clockwise using the first end 14 and starting at or near the point 18 of the optical fiber 12. Layer 1 is wound in an upward direction as viewed in FIG. 1, i.e. each turn in the layer is formed above its preceding turn from an end 32 to an end 31 of a sensor spool 33. The quadrupole wound fiber optic coil 10 has a sensing axis 34 which, in the case of the quadrupole wound fiber optic coil 10 shown in FIG. 1, is along the centerline of the sensor spool 33. When the desired number of turns of layer 1 are wound, layer 2 is wound counterclockwise using the second end 16 and starting at or near the point 18 of the optical fiber 12. Layer 2 is also wound in an upward direction as viewed in FIG. 1 from the end 32 to the end 31 of the sensor spool 33.

Counterclockwise winding of the second end 16 of the optical fiber 12 is continued in a downward direction in order to wind layer 3 from the end 31 to the end 32 of the sensor spool 33. The first end 14 of the optical 5 fiber 12 is bridged over from layer 1 to layer 4 by way of a loop 21 of the optical fiber 12 and layer 4 is wound clockwise in the downward direction from the end 31 to the end 32 of the sensor spool 33. Layer 5 is wound clockwise, using the first end 14 of the optical fiber 12, in the upward direction from the end 32 to the end 31 of the sensor spool 33. The second end 16 of the optical fiber 12 is bridged from layer 3 to layer 6 by way of a loop 25 of the optical fiber 12 and layers 6 and 7 are wound counterclockwise between the ends 31 and 32 of the sensor spool 33 in the directions of the arrows. The first end 14 of the optical fiber 12 is bridged from layer 5 to layer 8 by way of a loop 26 of the optical fiber 12 and layer 8 is wound clockwise, in the direction of the arrow, from the end 31 to the end 32 of the sensor spool 33.

As can be seen in FIG. 1, the turns with the "X" indicate that they are wound from the first end 14 of the optical fiber 12 in one of the clockwise and counterclockwise directions, and the turns without the "X" indicate that they are wound from the second end 16 of the optical fiber 12 in the other of the clockwise and counterclockwise directions. Also, the layers of the quadrupole wound fiber optic coil 10, for convenience, are indicated with "+" and "−" symbols at 22 in order to indicate the end of the optical fiber 12 which is used to wind each of the layers and the relative direction in which each of the turns of the layers is wound. Accordingly, layers 1–4 form a first quadrupole, and layers 5–8 form a second quadrupole. As shown in FIG. 1, the two quadrupoles have the same +−−+ predetermined winding pattern.

Thus, a quadrupole is normally described as having a total number of layers which is some multiple of four. However, after this number of layers is wound, the length of optical fiber in the combined+layers of the quadrupole may be unequal to the length of optical fiber in the combined layers of the quadrupole. For example, the layers of the quadrupole may not have an equal number of turns. If so, error in the output of the quadrupole may result. Therefore, it has been the practice to add one or two extra layers to the quadrupole in order to equalize the length of optical fiber in the combined+layers to the length of optical fiber in the combined−layers. These one or two extra layers are not trimming layers, but are added merely to complete the predetermined winding pattern of the quadrupole.

As the arrows in FIG. 5 indicate, the winding of layers 1 and 2 begins near the point 18 of the optical fiber 12 and proceeds, in the direction of the arrows shown in FIG. 5, from the point 18 toward an extremity 23 of the first end 14 of the optical fiber 12 and toward an extremity 24 of the second end 16 of the optical fiber 12. The extremity 23 of the first end 14 of the optical fiber 12 is brought out of the quadrupole wound fiber optic coil 10, and the extremity 24 of the second end 16 of the optical fiber 12 is also brought out of the quadrupole wound fiber optic coil 10. Two light beams, which may be split from a single light beam and which are used to counterpropagate along the optical path provided by the optical fiber 12, are injected into the corresponding extremities 23 and 24. The light beam, which is injected into the extremity 23, propagates through layers 8, 5, 4, 1, 2, 3, 6, and 7, in order, and exits from the extremity 24. The other light beam, which is injected into the extremity 24, propagates through layers 7, 6, 3, 2, 1, 4, 5, and 8, in order, and exits from the extremity 23. The exiting light beams are recombined and are sensed by a detector so that the phases of the two light beams can be compared.

As can be seen from the right-hand side of FIG. 1, because of the way in which the quadrupole wound fiber optic coil 10 is typically wound, the "+" and "−" layers are offset by an axial distance 27. That is, turn 1 of layer 1 is offset from turn 1 of layer 2 by the axial distance 27, turn 2 of layer 1 is offset from turn 2 of layer 2 by the axial distance 27, and so on. As a result of the winding processes which are used to wind quadrupole wound fiber optic coils such as the quadrupole wound fiber optic coil 10, this axial distance 27 can be one fiber diameter as shown, a fraction of a fiber diameter, or several fiber diameters. Because of the axial spatial offset resulting from this axial distance 27, if an axial time varying thermal gradient is applied to the fiber optic coil, turns of the "+" layers see a slightly different rate of temperature change than do the corresponding turns of the "−" layers.

It can be seen that, because the "−" half is spatially offset from the "+" half of the quadrupole wound fiber optic coil 10, there is a slightly different rate of temperature change that is experienced by the counterpropagating light beams travelling through corresponding turns of the "+" and "−" halves of the quadrupole wound fiber optic coil 10. (The coil halves of the quadrupole wound fiber optic coil 10 are (1) all of the "+" turns which are wound in the clockwise direction and (2) all of the "−" turns which are wound in the counterclockwise direction). Consequently, the counterpropagating light beams travel through different path lengths. Because the counterpropagating light beams travel through different path lengths, a phase difference between the light beams which exit the optical fiber 12 will result. This phase difference is defined herein as an error because it is not related to rotation of the rotation sensor which incorporates the quadrupole wound fiber optic coil 10.

The time varying temperature gradient can be given by the following equation:

$$\frac{\Delta T_{ax}}{\Delta t} = \frac{\Delta T_{31}}{\Delta t} - \frac{\Delta T_{32}}{\Delta t} \quad (1)$$

where $\Delta T_{31}/\Delta t$ is the rate of temperature change at the end 31 of the coil, $\Delta T_{32}/\Delta t$ is the rate of temperature change at the end 32 of the coil, and $\Delta T_{ax}/\Delta t$ is the axial difference between the rates of temperature change at the two ends of the coil. The difference d in the rates of temperature change between corresponding turns of the "+" and "−" layers (which are separated by the axial distance 27) is $\Delta T_{ax}/\Delta t$ divided by the number of turns in a layer. Although this difference d is quite small, the effect of this small difference accumulates over an entire coil half and becomes relatively large. The accumulation of this effect over the entire coil produces a phase difference between the counterpropagating beams which will result in a relatively large false indication of rotation.

Figure 2:
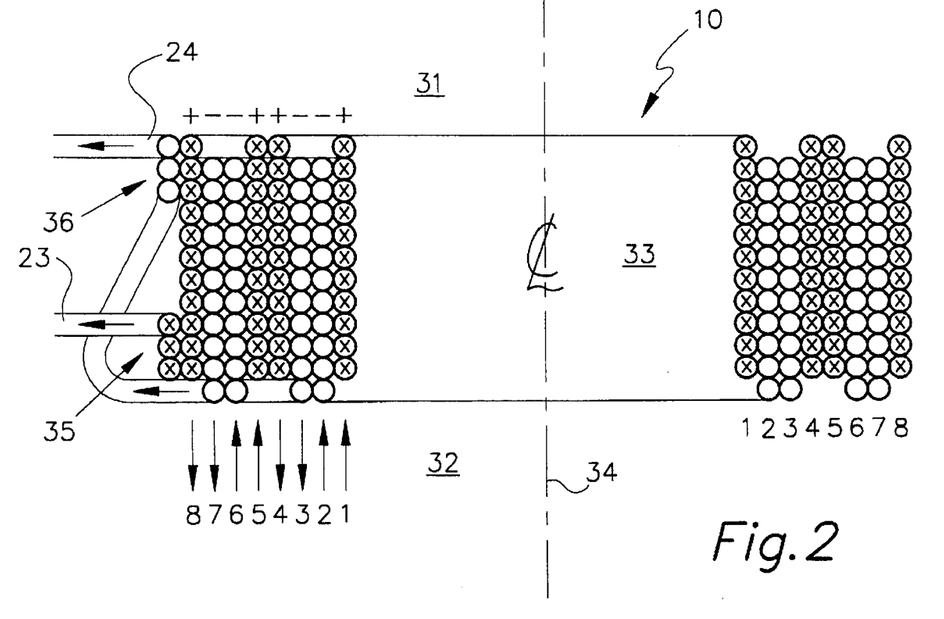
FIG. 2 shows an arrangement employing positive trimming of the fiber optic coil shown in FIG. 1 so as to substantially eliminating axial related errors.

One manner of reducing this axial time varying temperature gradient dependent error is to positively trim the quadrupole wound fiber optic coil 10 by adding trimming lengths from the first and second ends 14 and 16 of the optical fiber 12 to the quadrupole wound fiber optic coil 10 and by axially displacing these trimming lengths from one another. For example, as shown in FIG. 2, after layer 8 has been wound with the first end 14 of the optical fiber 12, a first trimming length 35 of the first end 14 of the optical fiber 12 is provided at or near the outside perimeter of the quadrupole wound fiber optic coil 10. The first trimming length 35 may be in the form of a number of trimming turns wound around the outside perimeter of the quadrupole wound fiber optic coil 10 and may be located at or near the end 32 of the sensor spool 33. Similarly, a second trimming length 36 of the second end 16 of the optical fiber 12 is provided at or near the outside perimeter of the quadrupole wound fiber optic coil 10. The second trimming length 36 may be in form of a number of trimming turns wound around the outside perimeter of the quadrupole wound fiber optic coil 10 and may be located at or near the end 31 of the sensor spool 33.

As shown in FIG. 2, the first and second trimming lengths 35 and 36 are axially, but not radially, displaced from one another. The amount of the first and second trimming lengths 35 and 36, as well as the amount of displacement between the first and second trimming lengths 35 and 36, can be selected to minimize the axial related error resulting from the axial time varying temperature gradient experienced by the quadrupole wound fiber optic coil 10. That is, during trimming of the quadrupole wound fiber optic coil 10, light beams may be injected into the extremities 23 and 24 of the optical fiber 12 with the quadrupole wound fiber optic coil 10 mounted on a stationary, stable platform. An axial time varying temperature gradient may be applied to the quadrupole wound fiber optic coil 10. The counterpropagating light beams exiting the extremities 23 and 24 may be combined and the phase difference sensed. The first and second trimming lengths 35 and 36 may then be added, with a total length and with a spatial offset, until the axial related error, which results from the axial time varying temperature gradient acting on the spatial displacement of the two halves of the coil, is sufficiently reduced.

Figure 3:
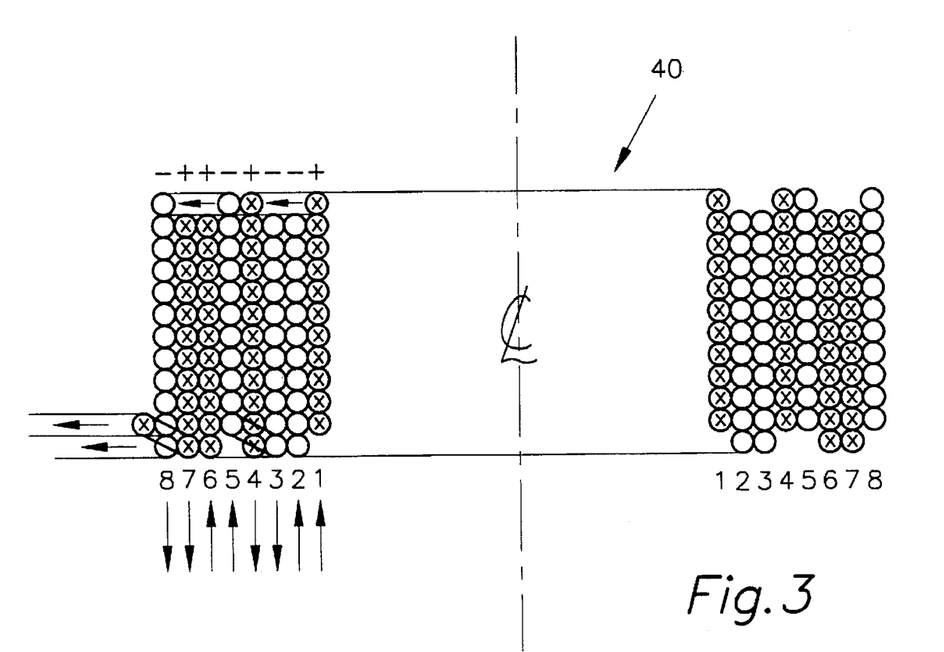
FIG. 3 shows another fiber optic coil arrangement which is wound with a +--+--++-- predetermined winding pattern.

Trimming can also be advantageously applied to other fiber optic coils such as to octupole wound fiber optic coils. An octupole wound fiber optic coil 40 is shown in FIG. 3. The octupole wound fiber optic coil 40 may have a sensing axis along its centerline.

The octupole wound fiber optic coil 40 is essentially a sequence of reversely wound quadrupoles. That is, the layers 1–4 of the octupole wound fiber optic coil 40 are wound with a quadrupole +−−+ predetermined winding pattern, whereas the layers 5–8 of the octupole wound fiber optic coil 40 are wound with a reverse quadrupole −++− predetermined winding pattern. Specifically, the "+" first end 14 of the optical fiber 12, starting at or near the point 18, is used to wind layer 1, the "−" second end 16 of the optical fiber 12, starting at or near the point 18, is used to wind layers 2 and 3, the "+" first end 14 of the optical fiber 12 is used to wind layer 4, the "−" second end 16 of the optical fiber 12 is used to wind layer 5, the "+" first end 14 of the optical fiber 12 is use to wind layers 6 and 7, and the "−" second end 16 of the optical fiber 12 is used to wind layer 8. Layers 1, 4, 6 and 7 may be wound in the clockwise direction and layers 2, 3, 5 and 8 may be wound in the counterclockwise direction.

Figure 4:
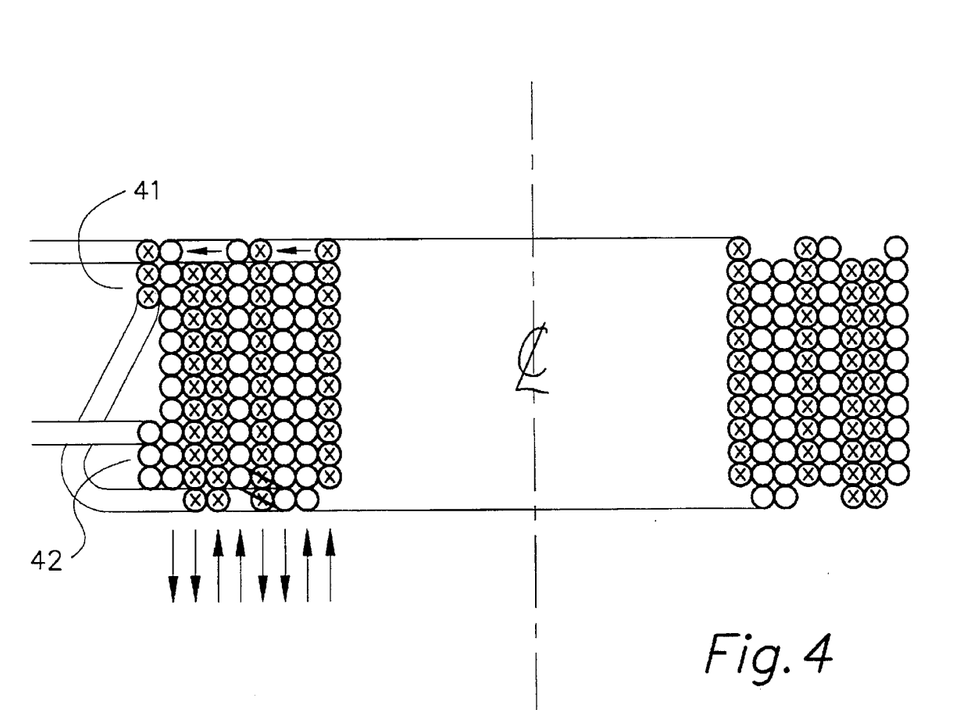
FIG. 4 shows an arrangement employing positive trimming of the fiber optic coil shown in FIG. 3 so as to substantially eliminating axial related errors.

Any axial related error resulting from an axially oriented time varying temperature gradient can be substantially eliminated by trimming the octupole wound fiber optic coil 40 with trimming lengths 41 and 42 as shown in FIG. 4. These trimming lengths 41 and 42 may be applied in the same manner or manners as described in connection with FIG. 2.

Figure 6:
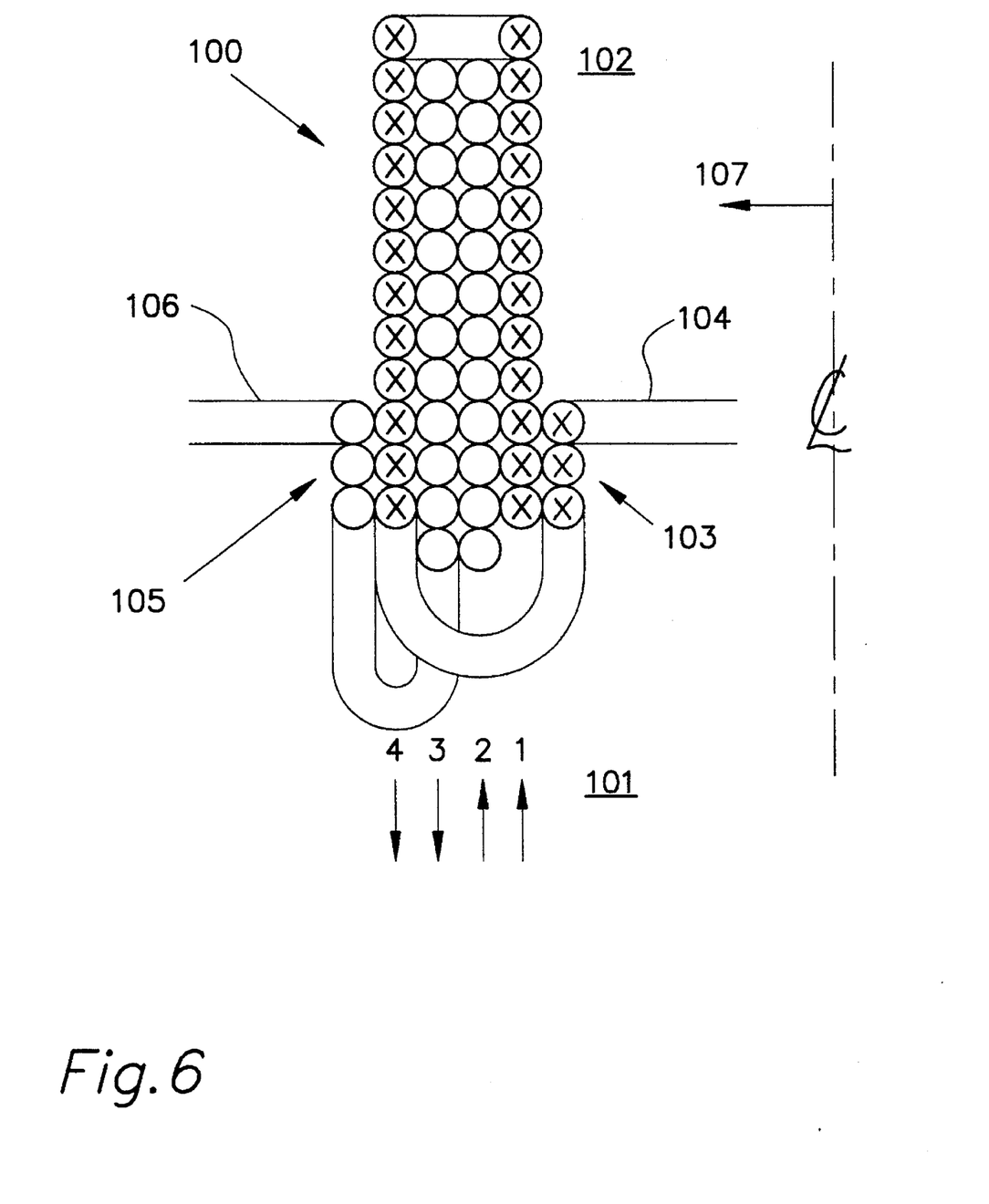
FIG. 6 shows an arrangement employing positive trimming of a fiber optic coil in order to substantially eliminate radial related errors.

As shown in FIG. 6, trimming can also be used to compensate for radial related errors resulting from a time varying temperature gradient applied in the radial direction. A fiber optic coil 100 has layers 1, 2, 3, and 4, although the fiber optic coil 100 may have fewer or more layers. Also, the fiber optic coil 100 may represent a quadrupole wound fiber optic coil, an octupole wound fiber optic coil, or any other fiber optic coil. Each layer of the fiber optic coil 100 has a plurality of turns. The fiber optic coil 100 may have a sensing axis along its centerline. Layer 1 is wound from the first end 14 of the optical fiber 12 from an end 101 to an end 102 of the fiber optic coil 100. Layer 2 is wound from the second end 16 of the optical fiber 12 from the end 101 to the end 102 of the fiber optic coil 100. Layer 3 is wound from the second end 16 of the optical fiber 12 from the end 102 to the end 101 of the fiber optic coil 100. Layer 4 is wound from the first end 14 of the optical fiber 12 from the end 102 to the end 101 of the fiber optic coil 100.

After the outermost layer of the fiber optic coil 100 (i.e., layer 4 in the example of FIG. 6) is wound, the first end 14 of the optical fiber 12 is used to provide a trimming length 103 at or near the inner perimeter of the fiber optic coil 100 and is then brought out as an extension 104 in order to receive a first light beam and to output a second light beam. The trimming length 103 may be in form of a number of trimming turns wound around the inside perimeter of the fiber optic coil 100 and may be located at or near its end 101, although the trimming length 103 can be located anywhere on or near the fiber optic coil 100. Similarly, the second end 16 of the optical fiber 12 is used to provide a trimming length 105 at or near the outer perimeter of the fiber optic coil 100 and is then brought out as an extension 106 in order to receive the second light beam and to output the first light beam. The trimming length 105 may be in form of a number of trimming turns wound around the outside perimeter of the fiber optic coil 100 and may be located at or near its end 101, although the trimming length 105 can be located anywhere on or near the fiber optic coil 100.

As seen in FIG. 6, the trimming lengths 103 and 105 are spatially offset from one another in the radial direction but not in the axial direction. The radial direction is shown by an arrow 107. Thus, the amount of the trimming lengths 103 and 105, and the amount of spatial offset between the trimming lengths 103 and 105, can be selected in order to compensate for (i.e. reduce) radial related errors resulting from a radially applied time varying gradient. That is, during trimming of the fiber optic coil 100, light beams may be injected into the extensions 104 and 106 of the optical fiber 12 with the fiber optic coil 100 mounted on a stationary, stable platform. A radial time varying temperature gradient may be applied to the fiber optic coil 100. The counterpropagating light beams exiting the extensions 104 and 106 may be combined and the phase difference sensed. The first and second trimming lengths 103 and 105 may then be added, with a total length and with a spatial offset, until the radial related error, which results from the radial time varying temperature gradient acting on the spatial displacement of the two halves of the coil, is minimized.

Figure 7:
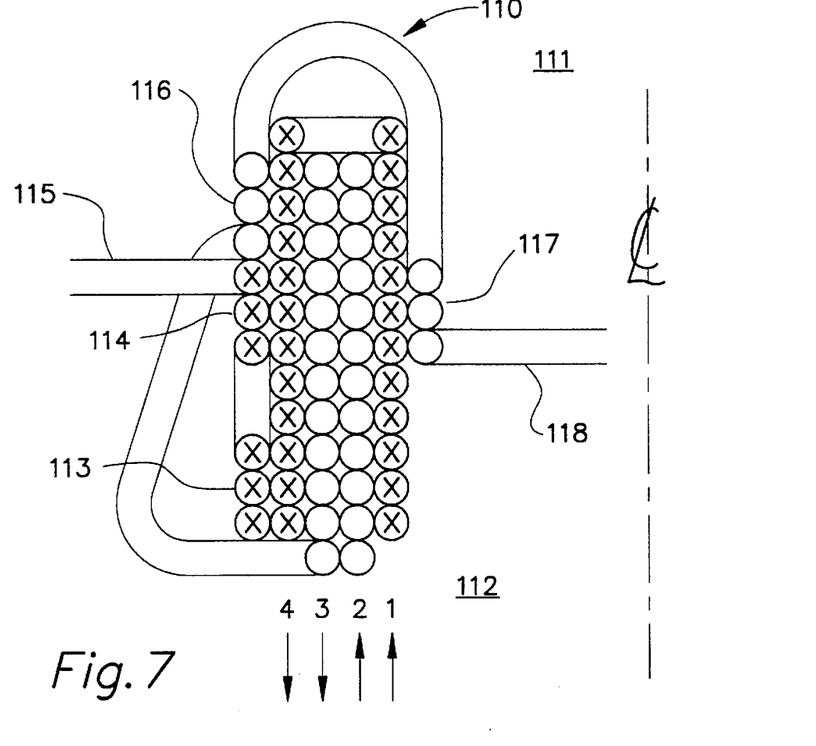
FIG. 7 shows an arrangement employing positive trimming of a fiber optic coil in order to substantially eliminate both axial and radial related errors.

As shown in FIG. 7, trimming can be used to compensate for axial and radial related errors resulting from both a time varying temperature gradient applied in the axial direction and a time varying temperature gradient applied in the radial direction. A fiber optic coil 110 has layers 1, 2, 3, and 4, although the fiber optic coil 110 may have fewer or more layers. Also, the fiber optic coil 110 may represent a quadrupole wound fiber optic coil, an octupole wound fiber optic coil, or any other fiber optic coil. Each layer of the fiber optic coil 110 has a plurality of turns. The fiber optic coil 110 may have a sensing axis along its centerline. Layer 1 is wound from the first end 14 of the optical fiber 12 from an end 112 to an end 111 of the fiber optic coil 110. Layer 2 is wound from the second end 16 of the optical fiber 12 from the end 112 to the end 111 of the fiber optic coil 110. Layer 3 is wound from the second end 16 of the optical fiber 12 from the end 111 toward the end 112 of the fiber optic coil 110. Layer 4 is wound from the first end 14 of the optical fiber 12 from the end 111 toward the end 112 of the fiber optic coil 110.

After the outermost layer of the fiber optic coil 110 (i.e., layer 4 in the example of FIG. 7) is wound, the first end 14 of the optical fiber 12 is used to provide trimming lengths 113 and 114 at or near the outer perimeter of the fiber optic coil 110. The first end 14 of the optical fiber 12 is then brought out as an extension 115 in order to receive a first light beam and to output a second light beam. The trimming lengths 113 and 114 may each be in form of a corresponding number of trimming turns which are wound around the outside perimeter of the fiber optic coil 100. Similarly, the second end 16 of the optical fiber 12 is used to provide a trimming length 116 at or near the outer perimeter of the fiber optic coil 100 and a trimming length 117 at or near the inner perimeter of the fiber optic coil 110. The second end 16 of the optical fiber 12 is then brought out as an extension 118 in order to receive the second light beam and to output the first light beam. The trimming lengths 116 and 117 may each be in form of a corresponding number of trimming turns which wound around the outside and inner perimeters of the fiber optic coil 110.

As seen in FIG. 7, the trimming lengths 113 and 116 are spatially offset from one another in the axial direction but not in the radial direction, whereas the trimming lengths 114 and 117 are spatially offset from one another in the radial direction but not in the axial direction. Thus, the total length of the trimming lengths 113 and 116, and the amount of spatial offset between the trimming lengths 113 and 116, can be selected in order to compensate for (i.e. reduce) axial related errors resulting from an axially applied time varying temperature gradient. Also, the total length of the trimming lengths 114 and 117, and the amount of spatial offset between the trimming lengths 114 and 117, can be selected in order to compensate for (i.e. reduce) radial related errors resulting from a radially applied time varying temperature gradient.

Accordingly, light beams may be injected into the extensions 115 and 118 with the fiber optic coil 110 mounted on a stationary, stable platform. An axial time varying temperature gradient may be applied to the fiber optic coil 110. The counterpropagating light beams exiting extensions 115 and 118 may be combined and the phase difference sensed. The trimming lengths 113 and 116 can then be added, with a total length and with an axial spatial offset, until the axial related error, which results from the axial time varying temperature gradient acting on the spatial displacement of the two halves of the coil, is minimized. Then, a time varying temperature gradient may be applied in the radial direction, and the trimming lengths 114 and 117 may then be added, with a total length and with a radial offset, until the radial related error, which results from the radial time varying temperature gradient acting on the optical fiber layers, is minimized.

Figure 8:
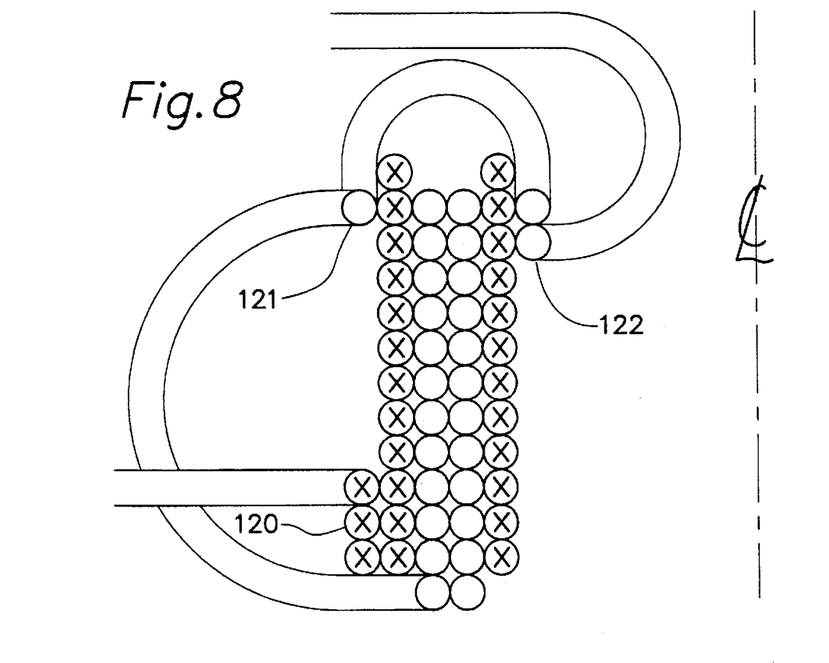
FIG. 8 shows an arrangement similar to the arrangement shown in FIG. 7 but where the amount of optical fiber used in positively trimming the fiber optic coil is less.

Some of the trimming lengths shown in FIG. 7 can be eliminated, if desired. As viewed in FIG. 7, if the trimming lengths 114 and 117 are wound in the same axial relationship as the trimming length 116, e.g. near the end 111 of the fiber optic coil 110, then any effects on the propagation of light through the trimming length 116 and on the propagation of light through the trimming length 114 are the same, and there is no net effect. Therefore, the same reduction in error is realized as long as an equal number of turns are removed from the trimming lengths 114 and 116. Such an arrangement is shown in FIG. 8. FIG. 8 assumes that the trimming length 114 has two turns between the trimming length 113 and the extension (i.e., lead) 115, and that the trimming length 117 has two turns between the trimming length 116 and the extension 118. Accordingly, the trimming length 120 corresponds to the trimming length 113, the trimming length 121 results after the two turns of the trimming length 114 cancel two of the three turns of the trimming length 116, and the trimming length 122 corresponds to the trimming length 117.

As seen in FIG. 8, the trimming length 120 is spatially offset from the trimming lengths 121 and 122 in the axial direction and the trimming lengths 121 and 122 are spatially offset from one another in the radial direction. The fiber optic coil shown in FIG. 8 may have a sensing axis along its centerline. By comparing FIGS. 7 and 8, it can be seen that two turns of the trimming length 116 have been eliminated and the two turns of the trimming length 114 have been eliminated. Yet the fiber optic coil shown in FIG. 8 achieves the same reduction in error as is achieved by the fiber optic coil shown in FIG. 7.

The positive trimming of a fiber optic coil as described above is effective to reduce axial and/or radial related errors because the additional length of optical fiber used in the positive trimming process is placed in a manner so as to interrupt, or be inconsistent with, the predetermined winding pattern with which the fiber optic coil is wound. Used in this way, "interrupt" may be defined as breaking the continuity or uniformity of the predetermined winding pattern with which the fiber optic coil is wound.

A quadrupole wound fiber optic coil is wound, for example, so that it has one or more segments wherein each segment has the same +—-+ predetermined winding pattern. Furthermore, each half of the quadrupole wound fiber optic coil which is wound with this predetermined winding pattern has substantially the same number of turns as any other layer, and the length of optical fiber which is used to wind all of the "+" layers is substantially equal to the length of optical fiber which is used to wind all of the "−" layers. Accordingly, each turn in the predetermined winding pattern may be predicted from the previously wound turns in a quadrupole wound fiber optic coil. The additional length of optical fiber used to positively trim a fiber optic coil is placed so that the location of the additional length of optical fiber is not predictable from the placement of the turns in the predictable winding pattern of the fiber optic coil.

Similarly, a fiber optic coil may be negatively trimmed by removing a sufficient amount of the predictable turns of the optical fiber so as to interrupt the predetermined winding pattern with which the fiber optic coil is wound in order to thereby reduce axial and/or radial related errors which would have otherwise resulted. Thus, a fiber optic coil may be negatively trimmed by removing a trimming length of the optical fiber from the previously wound fiber optic coil so as to interrupt the predetermined winding pattern with which the fiber optic coil was wound. Alternatively, the fiber optic coil may be negatively trimmed by terminating winding of the fiber optic coil before the predetermined winding pattern of the fiber optic coil has been completed. The point at which winding is terminated may be selected so as to reduce axial or radial related errors to a desired level.

Figure 9:
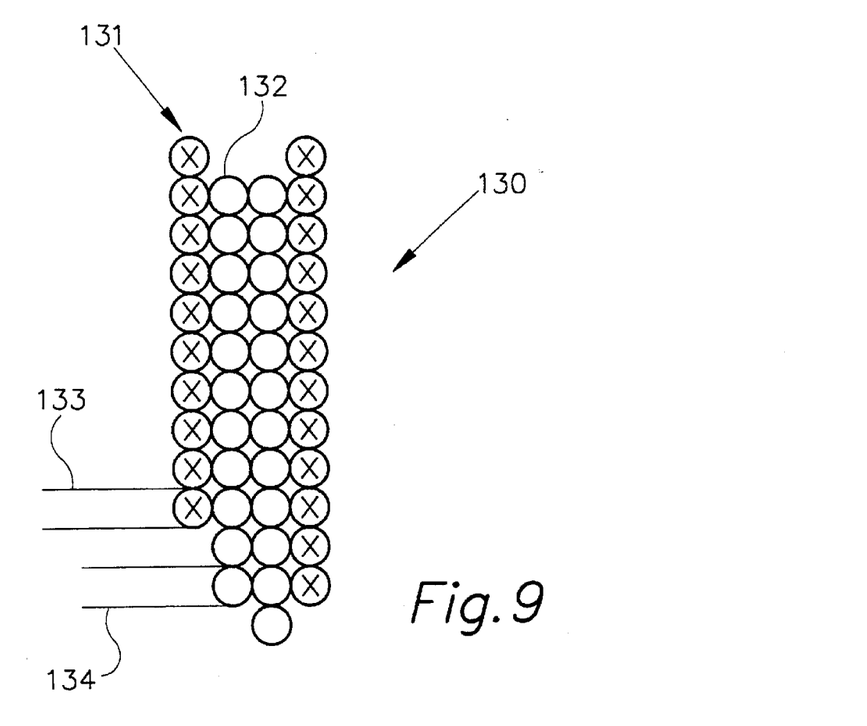
FIG. 9 shows an arrangement employing negative trimming of a fiber optic coil in order to substantially eliminate axial related errors; and, FIG. 10 shows another arrangement employing negative trimming of a fiber optic coil in order to substantially eliminate radial related errors.

A fiber optic coil 130, which has been negatively trimmed, is shown in FIG. 9. The fiber optic coil 130 may have fewer or more layers. Also, the fiber optic coil 130 may represent a quadrupole wound fiber optic coil, an octupole wound fiber optic coil, or any other fiber optic coil. Before negative trimming, the fiber optic coil 130 had been wound such that each segment of the fiber optic coil 130 had the typical quadrupole +--+ predetermined winding pattern, such that each half of the fiber optic coil 130 had substantially the same number of turns, and such that the length of optical fiber which was used to wind all of the "+" layers was substantially equal to the length of optical fiber which was used to wind all of the "−" layers. Accordingly, each turn in the predetermined winding pattern may be predicted from the previously wound turns in the fiber optic coil 130.

As shown in FIG. 9, the fiber optic coil 130 has an outermost "+" layer 131 and an outermost "−" layer 132. The fiber optic coil 130 may have a sensing axis along its centerline. The fiber optic coil 130 is initially wound so that the outermost "+" layer 131 and the outermost "−" layer 132 has all of the turns necessary for completing the predetermined winding pattern of a typical quadrupole wound fiber optic coil. Thereafter, an amount of the optical fiber is removed from the outermost "+" layer 131 and/or from the outermost "−" layer 132. This amount is selected so that axial or radial related errors are reduced to a desired level.

As specifically shown in FIG. 9, two turns of the outermost "+" layer 131 have been removed, and one turn from the outermost "−" layer 132 has been removed. However, it should be understood that the amount of optical fiber which must be removed from the fiber optic coil 130 in order to reduce the axial or radial related errors to the desired level may vary from that shown in FIG. 9. The specific amount of optical fiber which must be removed from the fiber optic coil 130 in order to reduce axial or radial related errors to the desired level is dependent upon such factors as the size of the fiber optic coil 130, the consistency with which the layers of the fiber optic coil 130 are wound, and/or the like.

Thus, the predetermined winding pattern in which the fiber optic coil 130 had been wound prior to trimming has been interrupted by the removal of optical fiber from the outermost "+" layer 131 and/or the outermost "−" layer 132 of the fiber optic coil 130. The amount of this interruption is chosen so as reduce axial or radial related errors which would have otherwise been produced by the fiber optic coil 130. Furthermore, although FIG. 9 shows removal of optical fiber from the outermost "+" and "−" layers 131 and 132 of the fiber optic coil 130, optical fiber may be removed from any of the other layers of the fiber optic coil 30 so long as axial or radial related errors of the fiber optic coil 130 are reduced. However, the removal of optical fiber from layers other than the outermost "+" and "−" layers 131 and 132 of the fiber optic coil 130 may require splicing of the optical fiber in order to rejoin the ends of the optical fiber of the fiber optic coil 130 after a trimming length of optical fiber has been removed during the negative trimming process. Alternatively, instead of removing optical fiber from one or more inner layers which would then require splicing, one or more turns, or portions thereof, may be omitted during winding of one or more inner layers. This process would not leave ends which would require splicing.

The negative trimming of a fiber optic coil may be implemented by a procedure similar to the procedure used in the positive trimming of a fiber optic coil. Thus, the fiber optic coil may be mounted on a stationary, stable platform. Light beams may be injected into the extremities, such as extensions 133 and 134, of the fiber optic coil 130 so that counterpropagating light beams travel through the optical fiber of the fiber optic coil 130. The fiber optic coil 130 may be subjected to an axial or radial time varying temperature gradient. Portions of the outermost "+" layer 131 and/or the outermost "−" layer 132 may be removed until there is little or no phase difference between the counterpropagating light beams exiting the extensions 133 and 134.

Figure 10:
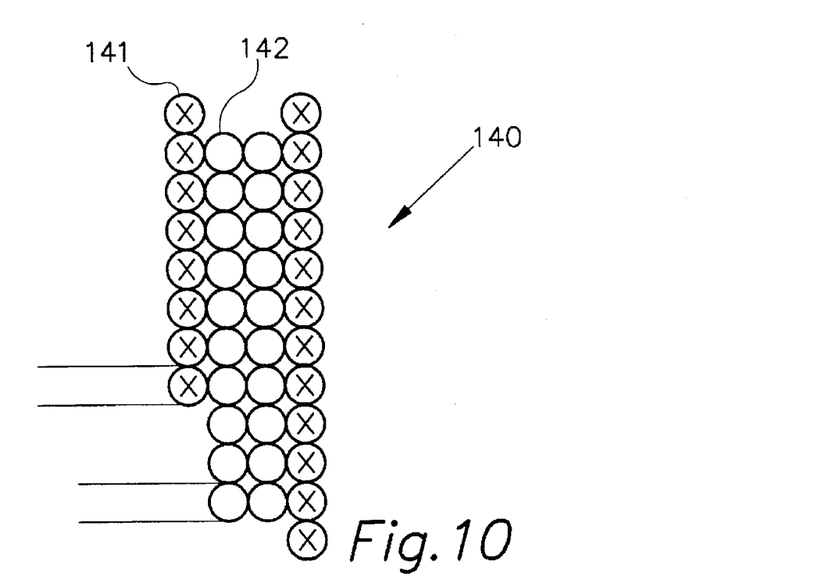

As discussed above, the specific amount of optical fiber which must be removed from a fiber optic coil in order to reduce axial or radial related errors to a desired level is variable and is dependent upon the particular fiber optic coil being trimmed. Accordingly, as shown in FIG. 10, it may be possible to remove optical fiber from only one of the layers of a fiber optic coil in order to implement negative trimming. Thus, a fiber optic coil 140 includes an outermost "+" layer 141 and an outermost "−" layer 142. The outermost "−" layer 142, before trimming, had sufficient turns to complete the predetermined winding pattern of a quadrupole wound fiber optic coil such as the quadrupole wound fiber optic coil 10 shown in FIG. 1. However, the outermost "+" layer 141, which initially had sufficient optical fiber therein to complete the predetermined winding pattern of this quadrupole wound fiber optic coil, has sufficient optical fiber removed so as to reduce axial or radial related errors which would have otherwise resulted. The fiber optic coil 140 may have a sensing axis along its centerline.

Modifications to the present invention may be made without departing from the scope of the present invention. For example, the trimming as disclosed herein has been applied to reduce axial or radial related error caused by axial or radial varying temperature gradients; however, trimming can be used to reduce errors exacerbated by causes other than axial or radial varying temperature gradients, such as errors from axial or radial time varying pressure gradients, axial or radial time varying strain gradients, axial or radial time varying acoustic vibration gradients, and errors resulting from axial or radial winding inconsistencies.

Also, although the negative trimming of a fiber optic coil as described above has been disclosed in relation to a quadrupole wound fiber optic coil, negative trimming may advantageously be applied to other types of fiber optic coils such as to the octupole wound fiber optic coil 40 shown in FIG. 3.

Additionally, as discussed above, although a fiber optic coil may be negatively trimmed by removing a trimming length of optical fiber from the previously wound fiber optic coil so as to interrupt the predetermined winding pattern with which the fiber optic coil was wound, the fiber optic coil may alternatively be negatively trimmed by terminating the winding of the fiber optic coil before the predetermined winding pattern of the fiber optic coil has been completed. The point at which the winding is terminated may be selected so as to reduce axial or radial related errors to a desired level.

Moreover, as discussed above, although a fiber optic coil may be negatively trimmed by removing a trimming length of optical fiber from the last layer of a previously wound fiber optic coil so as to interrupt the predetermined winding pattern with which the fiber optic coil was wound, the fiber optic coil may alternatively be negatively trimmed by removing a trimming length of optical fiber from a layer other than the last layer (such as the next to the last layer) of a previously wound fiber optic coil.

Furthermore, while the previously described embodiments of the present invention involve the negative trimming of axial related errors in a fiber optic coil or of radial related errors in a fiber optic coil, it may be possible to negatively trim both axial related errors and radial related errors in the same fiber optic coil. For example, optical fiber may be removed from both inner and outer layers of the fiber optic coil in a manner to trim away both axial and radial related errors. The optical fiber removed from the inner layer may require, as described above, splicing in order to reconnect the optical fiber ends resulting from removing a portion of optical fiber from one or more inner layers. Alternatively, instead of removing optical fiber from one or more inner layers which would then require splicing, one or more turns, or portions thereof, may be omitted during winding of one or more inner layers. This process would not leave ends which would require splicing.

Therefore, while this invention has been described in its preferred embodiments, its scope is not limited thereto. Rather, it is limited only insofar as defined in the following set of claims.

I claim:

1. A fiber optic coil assembly comprising:

a fiber optic coil having first and second axial ends, a plurality of layers wound between the first and second axial ends, and a midpoint, wherein the plurality of layers has a total of c turns of an optical fiber, wherein the optical fiber extends between a first extremity $E_1$ and a second extremity $E_2$, wherein $c_1$ turns of the c turns are wound from the midpoint with a first end of the optical fiber, wherein $c_2$ turns of the c turns are wound from the midpoint with a second end of the optical fiber, wherein $c=c_1+c_2$, wherein $l_1$ is the length of the optical fiber between $E_1$ and the midpoint and includes the $c_1$ turns, wherein $l_2$ is the length of the optical fiber between $E_2$ and the midpoint and includes the $c_2$ turns; and, error reducing means for reducing error between phases of light counterpropagating around the fiber optic coil, wherein the error reducing means includes a negative trimming length of the first end of the optical fiber, and wherein the negative trimming length is equal to $l_2-l_1$.

2. The fiber optic coil assembly of claim 1 wherein the fiber optic coil is wound in a +—+ predetermined pattern such that a first segment of layers is wound with the +—+ predetermined pattern and such that additional segments of layers, if any, are wound so as to continue the same +—+ predetermined pattern.

3. The fiber optic coil assembly of claim 1 wherein the fiber optic coil is wound in a +—+—++— predetermined pattern of layers such that a first segment of the layers are wound with the +—+—++— predetermined pattern and such that additional segments, if any, are wound so as to continue the same +—+—++— predetermined pattern.

4. The fiber optic coil assembly of claim 1 wherein the fiber optic coil is wound such that a first segment of the layers is wound with a +—+—++— predetermined pattern, such that a second segment of the layers is wound with a —++—+—+ predetermined pattern, and such that the first and second segments are consecutive segments.

5. A method of winding a fiber optic coil assembly comprising the steps of:

winding a fiber optic coil having s segments, wherein each of the s segments has a pattern of n layers of turns, wherein s is a number, wherein n is a number greater than one, wherein at least one of the n layers of turns is wound predominantly from a first end of an optical fiber, and wherein at least a second of the n layers of turns is wound predominantly from a second end of the optical fiber; and, removing a portion of at least one of the first and second ends of the optical fiber as a negative trimming length so that error between phases of light counterpropagating through the fiber optic coil is reduced from what the error would have been without the negative trimming length, wherein the negative trimming length is unequal in length to an s segment.

6. The method of claim 5 wherein the step of winding the fiber optic coil comprises the steps of winding a first segment of the fiber optic coil in a +—+ predetermined pattern of layers and winding additional segments, if any, in the same +—+ predetermined pattern.

7. The method of claim 5 wherein the step of winding the fiber optic coil comprises the steps of winding a first segment of the fiber optic coil in a +—30 —++— predetermined pattern of layers and winding additional segments, if any, in the same +—+—++— predetermined pattern.

8. The method of claim 5 wherein the step of winding the fiber optic coil comprises the steps of winding a first segment of the fiber optic coil in a +—+—++ predetermined pattern of layers and winding a second segment in a —++— +—+ predetermined pattern, such that the first and second segments are consecutive segments.

9. A fiber optic coil comprising a plurality of layers which are wound in a predetermined winding pattern, wherein the fiber optic coil has a sensing axis, wherein each layer includes a plurality of turns which are wound around the sensing axis and which are wound from an optical fiber, wherein each turn has a predictable location in the predetermined winding pattern, and wherein a portion of at least one layer of the optical fiber in the fiber optic coil is missing so as to interrupt the predetermined winding pattern of the fiber optic coil.

10. The fiber optic coil of claim 9 wherein the plurality of layers include a first layer wound predominantly from a first end of the optical fiber, wherein the plurality of layers include a second layer wound predominantly from a second end of the optical fiber, wherein the plurality of layers include a third layer wound predominantly from the second end of the optical fiber, and wherein the plurality of layers include a fourth layer wound predominantly from the first end of the optical fiber.

11. The fiber optic coil of claim 10 wherein the second layer is wound over the first layer, wherein the third layer is wound over the second layer, wherein the fourth layer is wound over the third layer, and wherein a portion of the optical fiber in the fourth layer of the fiber optic coil is missing so as to interrupt the predetermined winding pattern of the fiber optic coil.

12. The fiber optic coil of claim 10 wherein the second layer is wound over the first layer, wherein the third layer is wound over the second layer, wherein the fourth layer is wound over the third layer, and wherein a portion of the optical fiber in the third layer of the fiber optic coil is missing so as to interrupt the predetermined winding pattern of the fiber optic coil.

13. The fiber optic coil of claim 10 wherein the second layer is wound over the first layer, wherein the third layer is wound over the second layer, wherein the fourth layer is wound over the third layer, and wherein a portion of the optical fiber in each of the third and fourth layers of the fiber optic coil is missing so as to interrupt the predetermined winding pattern of the fiber optic coil.

14. The fiber optic coil of claim 9 wherein a portion of at least a last layer of the optical fiber in the fiber optic coil is missing so as to interrupt the predetermined winding pattern of the fiber optic coil.

15. The fiber optic coil of claim 9 wherein a portion of at least a next to a last layer of the optical fiber in the fiber optic coil is missing so as to interrupt the predetermined winding pattern of the fiber optic coil.

16. A method of winding a fiber optic coil, wherein the fiber optic coil has a sensing axis, wherein the method comprises the steps of:

winding a plurality of layers from an optical fiber in a predetermined winding pattern, wherein each layer is wound into a plurality of turns around the sensing axis so that each turn has a predictable location in the predetermined winding pattern; and, removing a portion of at least one layer of the optical fiber in the fiber optic coil so as to interrupt the predetermined winding pattern of the fiber optic coil.

17. The method of claim 16 wherein the step of winding a plurality of layers from an optical fiber in a predetermined winding pattern comprises the steps of:

winding a first layer predominantly from a first end of the optical fiber;

winding a second layer predominantly from a second end of the optical fiber;

winding a third layer predominantly from the second end of the optical fiber; and, winding a fourth layer predominantly from the first end of the optical fiber.

18. The method of claim 17 wherein:

the step of winding the second layer comprises the step of winding the second layer over the first layer;

the step of winding the third layer comprises the step of winding the third layer over the second layer;

the step of winding the fourth layer comprises the step of winding the fourth layer over the third layer; and, the step of removing a portion of the optical fiber comprises the step of removing a portion of the optical fiber in the fourth layer of the fiber optic coil so as to interrupt the predetermined winding pattern of the fiber optic coil.

19. The method of claim 17 wherein:

the step of winding the second layer comprises the step of winding the second layer over the first layer;

the step of winding the third layer comprises the step of winding the third layer over the second layer;

the step of winding the fourth layer comprises the step of winding the fourth layer over the third layer; and, the step of removing a portion of the optical fiber comprises the step of removing a portion of the optical fiber in the third layer of the fiber optic coil so as to interrupt the predetermined winding pattern of the fiber optic coil.

20. The method of claim 17 wherein: S the step of winding the second layer comprises the step of winding the second layer over the first layer;

the step of winding the third layer comprises the step of winding the third layer over the second layer;

the step of winding the fourth layer comprises the step of winding the fourth layer over the third layer; and, the step of removing a portion of the optical fiber comprises the step of removing a portion of the optical fiber in each of the third and fourth layers of the fiber optic coil so as to interrupt the predetermined winding pattern of the fiber optic coil.

21. A method of winding a fiber optic coil, wherein the fiber optic coil has a sensing axis, wherein the method comprises the steps of;

winding a plurality of layers from an optical fiber in a predetermined winding pattern, wherein each layer is wound into a plurality of turns around the sensing axis so that each turn has a predictable location in the predetermined winding pattern based; and, terminating winding before the predetermined winding pattern is complete so as to interrupt the predetermined winding pattern of the fiber optic coil.

22. The method of claim 21 wherein the step of winding a plurality of layers from an optical fiber in a predetermined winding pattern comprises the steps of:

winding a first layer predominantly from a first end of the optical fiber;

winding a second layer predominantly from a second end of the optical fiber;

winding a third layer predominantly from the second end of the optical fiber; and, winding a fourth layer predominantly from the first end of the optical fiber.

23. The method of claim 22 wherein:

the step of winding the second layer comprises the step of winding the second layer over the first layer;

the step of winding the third layer comprises the step of winding the third layer over the second layer;

the step of winding the fourth layer comprises the step of winding the fourth layer over the third layer; and, the step of terminating winding before the predetermined winding pattern is complete comprises the step of terminating winding of the fourth layer before the predetermined winding pattern is complete so as to interrupt the predetermined winding pattern of the fiber optic coil.

24. The method of claim 22 wherein:

the step of winding the second layer comprises the step of winding the second layer over the first layer;

the step of winding the third layer comprises the step of winding the third layer over the second layer;

the step of winding the fourth layer comprises the step of winding the fourth layer over the third layer; and, the step of terminating winding before the predetermined winding pattern is complete comprises the step of terminating winding of the third layer before the predetermined winding pattern is complete so as to interrupt the predetermined winding pattern of the fiber optic coil.

25. The method of claim 22 wherein:

the step of winding the second layer comprises the step of winding the second layer over the first layer;

the step of winding the third layer comprises the step of winding the third layer over the second layer;

the step of winding the fourth layer comprises the step of winding the fourth layer over the third layer; and, the step of terminating winding before the predetermined winding pattern is complete comprises the step of terminating winding of each of the third and fourth layers before the predetermined winding pattern is complete so as to interrupt the predetermined winding pattern of the fiber optic coil.

26. A method of winding a fiber optic coil, wherein the fiber optic coil has a sensing axis and is wound from an optical fiber having first and second ends, wherein the method comprises the steps of:

winding a first layer of turns from the first end of the optical fiber, wherein each turn in the first layer of turns is wound into a position which is consistent with a predetermined winding pattern;

winding a second layer of turns from the second end of the optical fiber, wherein each turn in the second layer of turns is wound into a position which is consistent with the predetermined winding pattern;

winding a third layer of turns from the second end of the optical fiber, wherein each turn in the third layer of turns is wound into a position which is consistent with the predetermined winding pattern;

winding a fourth layer of turns from the first end of the optical fiber, wherein each turn in the fourth layer of turns is wound into a position which is consistent with the predetermined winding pattern; and, removing a portion of at least one layer of the optical fiber in the fiber optic coil so as to interrupt the predetermined winding pattern of the fiber optic coil.

27. The method of claim 26 wherein the step of removing a portion of the optical fiber comprises the step of removing a portion of the optical fiber in the fourth layer of the fiber optic coil so as to interrupt the predetermined winding pattern of the fiber optic coil.

28. The method of claim 26 wherein the step of removing a portion of the optical fiber comprises the step of removing a portion of the optical fiber in the third layer of the fiber optic coil so as to interrupt the predetermined winding pattern of the fiber optic coil.

29. The method of claim 26 wherein the step of removing a portion of the optical fiber comprises the step of removing a portion of the optical fiber in each of the third and fourth layers of the fiber optic coil so as to interrupt the predetermined winding pattern of the fiber optic coil.

30. A method of winding a fiber optic coil, wherein the fiber optic coil has a sensing axis and is wound from an optical fiber having first and second ends, wherein the method comprises the steps of:

winding a first layer of turns from the first end of the optical fiber, wherein each turn in the first layer of turns is wound into a position which is consistent with a predetermined winding pattern;

winding a second layer of turns from the second end of the optical fiber, wherein each turn in the second layer of turns is wound into a position which is consistent with the predetermined winding pattern;

winding a third layer of turns from the second end of the optical fiber, wherein each turn in the third layer of turns is wound into a position which is consistent with the predetermined winding pattern;

winding a fourth layer of turns from the first end of the optical fiber, wherein each turn in the fourth layer of turns is wound into a position which is consistent with the predetermined winding pattern; and, terminating winding of at least one of the layers before the predetermined winding pattern is complete so as to interrupt the predetermined winding pattern of the fiber optic coil.

31. The method of claim 30 wherein the step of terminating winding of at least one of the layers before the predetermined winding pattern is complete comprises the step of terminating winding of the fourth layer of the fiber optic coil so as to interrupt the predetermined winding pattern of the fiber optic coil.

32. The method of claim 30 wherein the step of terminating winding of at least one of the layers before the predetermined winding pattern is complete comprises the step of terminating winding of the third layer of the fiber optic coil so as to interrupt the predetermined winding pattern of the fiber optic coil.

33. The method of claim 30 wherein the step of terminating winding of at least one of the layers before the predetermined winding pattern is complete comprises the step of terminating winding of both of the third and fourth layers of the fiber optic coil so as to interrupt the predetermined winding pattern of the fiber optic coil.

34. A method of winding a fiber optic coil, wherein the fiber optic coil has a sensing axis, wherein the method comprises the steps of:

winding a plurality of layers from an optical fiber in a predetermined winding pattern, wherein each layer is wound into a plurality of turns around the sensing axis so that each turn has a predictable location in the predetermined winding pattern; and, removing a portion of at least one layer of the optical fiber in the fiber optic coil so as to interrupt the predetermined winding pattern of the fiber optic coil and so as to reduce measured error in the fiber optic coil.

35. The method of claim 34 wherein the step of winding a plurality of layers from an optical fiber in a predetermined winding pattern comprises the steps of:

winding a first layer predominantly from a first end of the optical fiber;

winding a second layer predominantly from a second end of the optical fiber;

winding a third layer predominantly from the second end of the optical fiber; and, winding a fourth layer predominantly from the first end of the optical fiber.

36. The method of claim 35 wherein:

the step of winding the second layer comprises the step of winding the second layer over the first layer;

the step of winding the third layer comprises the step of winding the third layer over the second layer;

the step of winding the fourth layer comprises the step of winding the fourth layer over the third layer; and, the step of removing a portion of the optical fiber comprises the step of removing a portion of the optical fiber in the fourth layer of the fiber optic coil so as to interrupt the predetermined winding pattern of the fiber optic coil.

37. The method of claim 35 wherein:

the step of winding the second layer comprises the step of winding the second layer over the first layer;

the step of winding the third layer comprises the step of winding the third layer over the second layer;

the step of winding the fourth layer comprises the step of winding the fourth layer over the third layer; and, the step of removing a portion of the optical fiber comprises the step of removing a portion of the optical fiber in the third layer of the fiber optic coil so as to interrupt the predetermined winding pattern of the fiber optic coil.

38. The method of claim 35 wherein:

the step of winding the second layer comprises the step of winding the second layer over the first layer;

the step of winding the third layer comprises the step of winding the third layer over the second layer;

the step of winding the fourth layer comprises the step of winding the fourth layer over the third layer; and, the step of removing a portion of the optical fiber comprises the step of removing a portion of the optical fiber in each of the third and fourth layers of the fiber optic coil so as to interrupt the predetermined winding pattern of the fiber optic coil.

39. The method of claim 34 wherein the step of winding a plurality of layers comprises the steps of winding a first segment of the fiber optic coil in a +——+ predetermined pattern of layers, and winding additional segments, if any, with the same +——+ predetermined pattern.

40. The method of claim 34 wherein the step of winding a plurality of layers comprises the steps of winding a first segment of the fiber optic coil in a +—+—++— predetermined pattern of layers, and winding additional segments, if any, with the same +—+—++— predetermined pattern.

41. The method of claim 34 wherein the step of winding a plurality of layers comprises the steps of winding a first segment of the fiber optic coil in a +—+—++— predetermined pattern and winding a second segment with a —++—+—+ predetermined pattern, such that the first and second segments are consecutive segments.

42. A method of trimming a fiber optic coil, wherein the fiber optic coil has a plurality of layers, and wherein each layer comprises a plurality of coil turns wound from a corresponding end of an optical fiber, the method comprising the following steps:

(a) mounting the fiber optic coil in such a manner that a difference between light beams counterpropagating through the fiber optic coil may be determined;

(b) observing the difference between the light beams counterpropagating through the fiber optic coil; and, (c) removing at least a portion of a layer of the fiber optic coil so as to reduce error between the phases of the light beams counterpropagating through the fiber optic coil.

43. The method of claim 42 wherein the step of mounting the fiber optic coil comprises the step of mounting the fiber optic coil on a stable, stationary platform.

44. The method of claim 43 wherein the step of mounting the fiber optic coil comprises the step of injecting light beams into each end of the optical fiber.

45. The method of claim 44 wherein the step of mounting the fiber optic coil comprises the step of applying environmental test conditions to the fiber optic coil.

46. The method of claim 45 wherein the step of applying environmental test conditions to the fiber optic coil comprises the step of applying a time varying temperature gradient to the fiber optic coil.

47. The method of claim 46 wherein the step of observing the difference between light beams counterpropagating through the fiber optic coil comprises the step of determining a phase difference between the light beams as they exit each end of the optical fiber.

48. The method of claim 47 wherein the step of removing at least a portion of a layer of the fiber optic coil comprises the step of removing a portion of a last layer of the fiber optic coil.

49. The method of claim 47 wherein the step of removing at least a portion of a layer of the fiber optic coil comprises the step of removing a portion of a layer which is adjacent to a last layer of the fiber optic coil.

50. The method of claim 47 wherein the step of removing at least a portion of a layer of the fiber optic coil comprises the step of removing a portion of both a last layer and a layer which is adjacent to the last layer of the fiber optic coil.

51. The method of claim 42 comprising the further step of performing steps (b) and (c) repeatedly until an acceptable difference between the light beams is observed.

52. The method of claim 51 wherein the step of mounting the fiber optic coil comprises the step of mounting the fiber optic coil on a stable, stationary platform.

53. The method of claim 52 wherein the step of mounting the fiber optic coil comprises the step of injecting light beams into each end of the optical fiber.

54. The method of claim 53 wherein the step of mounting the fiber optic coil comprises the step of applying environmental test conditions to the fiber optic coil.

55. The method of claim 54 wherein the step of applying environmental test conditions to the fiber optic coil comprises the step of applying a time varying temperature gradient to the fiber optic coil.

56. The method of claim 55 wherein the step of observing the difference between light beams counterpropagating through the fiber optic coil comprises the step of determining a phase difference between the light beams as they exit each end of the optical fiber.

57. The method of claim 56 wherein the step of removing at least a portion of a layer of the fiber optic coil comprises the step of removing a portion of a last layer of the fiber optic coil.

58. The method of claim 56 wherein the step of removing at least a portion of a layer of the fiber optic coil comprises the step of removing a portion of a layer which is adjacent to a last layer of the fiber optic coil.

59. The method of claim 56 wherein the step of removing at least a portion of a layer of the fiber optic coil comprises the step of removing a portion of both a last layer and a layer which is adjacent to the last layer of the fiber optic coil.

\* \* \* \* \*